Patented June 29, 1926.

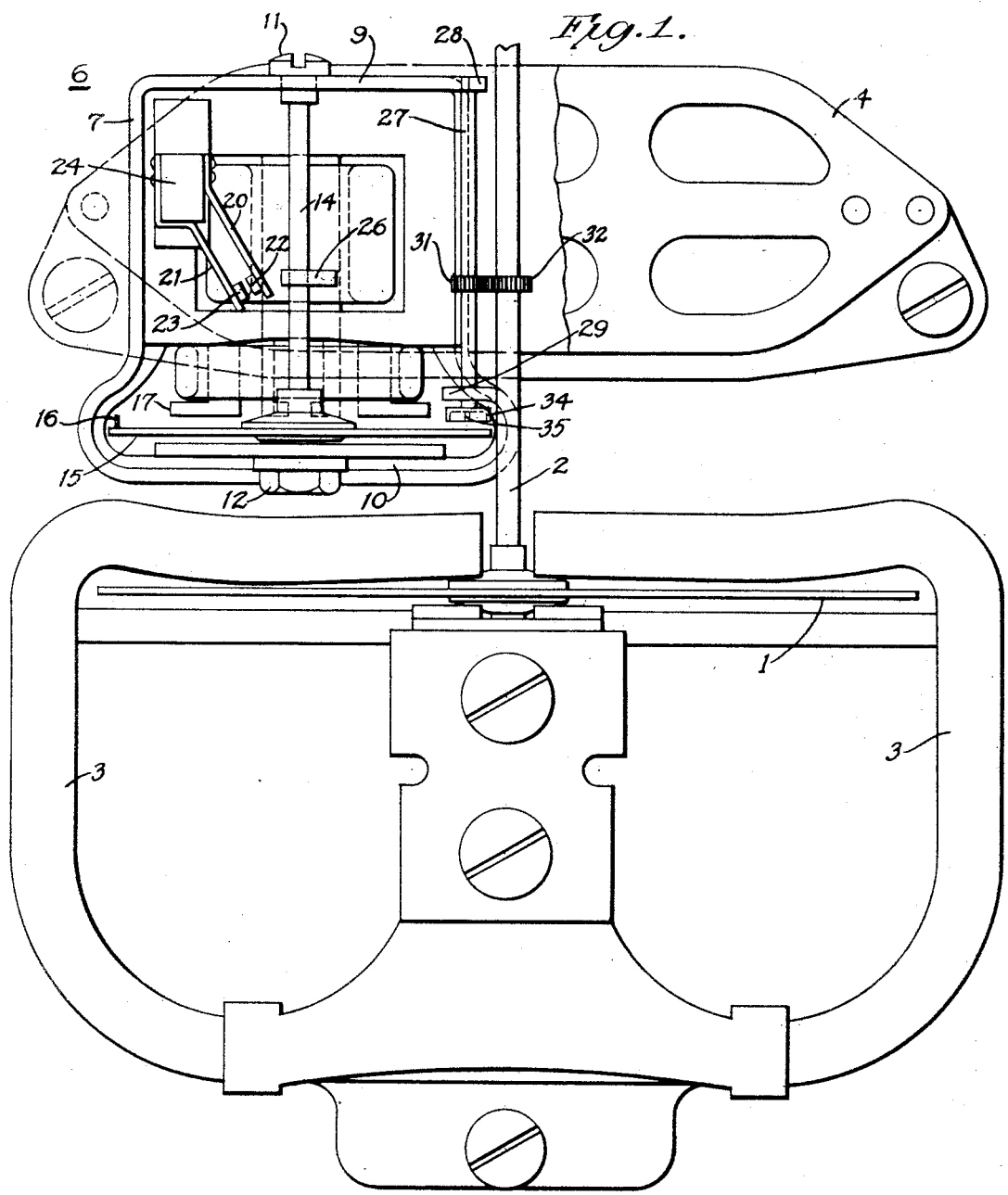

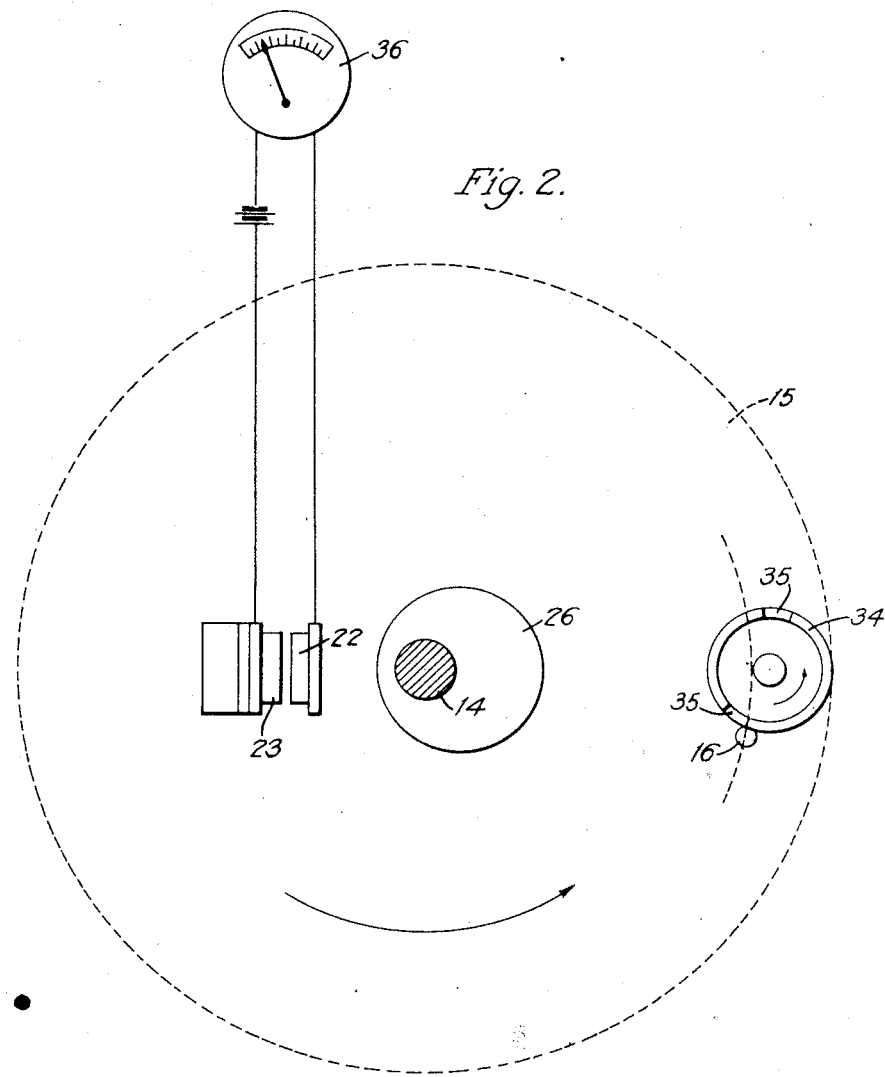

1,590,404

UNITED STATES PATENT OFFICE.

ALBERT J. ALLEN, OF BROOKLYN, NEW YORK.

METER ATTACHMENT.

Application filed December 7, 1923. Serial No. 679,120.

My invention relates to meter devices and particularly to attachments for integrating electric meters.

One object of my invention is to provide a device of the above indicated character whereby electrical impulses of a periodicity governed by the speed of the meter element may be effectively transmitted to a distant point.

Another object of my invention is to provide an attachment for an integrating meter whereby the mechanical energy for operating an auxiliary circuit-control device is supplied by means other than the movable meter element but is controlled by the latter.

A further object of my invention is to provide a signal or control attachment for an electric meter that shall be simple and durable in construction, economical to manufacture and effective in its operation.

In electrical service circuits, where it is desired to transmit the readings of a meter to a distant point, it is not always practical to effect the desired result in a simple effective manner, by reason of the torque characteristics of the transmitting meter. Any device which depends on the mechanical energy supplied by the movable meter element for directly operating a transmitter, necessarily impairs the accuracy of the meter.

Many suggestions have been made for relaying the action of a delicate meter, probably the best known of which is the meter employing a Kelvin balance that controls a separately energized pilot motor by means of a contact-making device. However, most of the devices of the prior art are comparatively complicated and expensive, are ineffective or are adapted only for application other than that for which the device of my invention is intended.

In whatever manner the distant transmission of meter readings has been accomplished, it is not known to me that any device has operated in accordance with the principle, has been so simple and effective or has been so well adapted for the particular field for which it is intended, as the device of my invention.

Accordingly, it is my aim to provide a device, for transmitting impulses in accordance with the operation of a usual and well known type of integrating meter, that shall be simple and effective and readily adapted for mounting on present well-known standard meters or in the place of the integrating mechanism at comparatively low cost.

In practicing my invention, I provide a continuously energized motor device, such as a constant-speed induction motor, although this is not essential so long as the motor operates above a predetermined speed, the movable element of which provides the mechanical energy for actuating a circuit-control device and which constantly tends, or is in a position, to actuate the control device. Thus, sufficient mechanical energy for actuating the circuit-control device is constantly available.

An element of sufficiently low inertia, and of such construction and relation to the meter, as to not impair the accuracy of the meter, is actuated by the meter to control the motor device. This is accomplished in such manner as to prevent the imposition of the mechanical energy of the motor on the meter element and to, at the same time, cause the motor to operate the circuit-control device in accordance with the operation of the meter.

In the accompanying drawings Fig. 1 is a view of a portion of an integrating meter and the attachment of my invention mounted thereon, and Fig. 2 is a detail view of a portion of the attachment.

The device illustrated comprises portions of an integrating meter, such as a watt-hour meter, including the usual armature disk 1 that is mounted on a shaft 2 and is adapted for operation by an electromagnet structure (not shown). Damping magnets 3 control the operation of the disk 1.

A frame structure 4 for supporting a usual and well known integrating mechanism (not shown) is adapted, in accordance with my invention, to support an attachment 6. The attachment 6 comprises a supporting frame 7 secured to the frame structure 4 and has upper and lower transverse sections 9 and 10, respectively which support bearing screws or members 11 and 12 for a shaft 14.

A disk 15, carrying a pin 16, is mounted on the shaft 14 and is adapted to be actuated by a field-magnet structure 17, as in a usual alternating-current induction-meter motor.

Resilient members 20 and 21, carrying contact members 22 and 23, respectively, are mounted on an insulating block 24 supported on the frame 7, from which they angularly depend to a position opposite a cam or lug member 26 on the shaft 14. A shaft 27, mounted in upper and lower bearings 28 and 29, respectively, on the frame 7, is provided, at an intermediate portion, with a pinion or gear 31 that meshes with a gear member 32 on the shaft 2 and, at its lower end, with a member 34. The latter is preferably constructed in the form of a shallow inverted cup having slots 35 therein (see Fig. 2).

In operation, when the disk 1 rotates in accordance with the quantity being measured by the meter, the member 34 is caused to rotate about a point in the path of travel of the pin 16. Any desired number of slots 35 may be provided and so arranged that no two of them are ever in alinement with the path of travel of the pin 16 at the same time. Thus, if, during the operation of the meter disk 1 and the motor disk 15, the pin 16 approaches the member 34 and one of the slots 35 is not in alinement with the path of travel of the pin 16, as shown in Fig. 2, the latter will be momentarily retarded until further rotation of the member 34 brings a slot into position opposite the pin 16. The pin then enters the member 34 and impinges against the opposite inner wall thereof until released, through one of the slots 35. If, when the pin 16 approaches the member 34, one of the slots 35 is in alinement therewith, the pin will enter the member 34 but will similarly impinge against the opposite inner wall thereof until released through one of the slots 35.

It is thus seen that, while the pin 16 is constantly tending to permit engagement of the contact members 22 and 23 by the projection 26, it is not permitted to do so except in accordance with the number of rotations of the disk 1. A demand indicator 36 or other metering device controlled by the contacts 22 and 23 is therefore actuated in accordance with the number of rotations of the disc 1 which is a measure of the load in the associated circuit.

The shaft 27, pinion 31 and the member 34 are so related to the shaft 2 and are of such relatively low inertia as to impose no appreciable additional load on the meter element. Also, the pin 16 impinges against the member 34, in substantially point contact therewith, at right angles to the direction of movement thereof and, thus, since there is no very great frictional surface engagement between the pin 16 and the member 34, there is substantially no imposition of force from the motor armature 15 upon the shaft 2.

Since, the gear member 32, is the only addition to the meter required for the mounting, the device is readily adapted for mounting on any similar mechanism embodying a movable element, such as the shaft 2.

By my invention, an exceedingly simple and effective attachment is provided by which the readings of meters may be transmitted to distant points or to demand indicators without materially affecting the accuracy of the meters.

While I have shown and described a particular form of my invention, changes may be effected therein without departing from the spirit and scope thereof, as set forth in the appended claim.

I claim as my invention:

The combination with an integrating meter, of a circuit-control device, a continuously operating induction motor including a shaft and a disk armature on the shaft, means on said shaft for actuating said circuit control device, a pin projecting from said disk, and a member operated by the meter to rotate about a point in the path of movement of said pin, said latter member co-operating with the pin to permit the disk armature to rotate in accordance with the operation of the meter.

In testimony whereof, I have hereunto subscribed my name this 1st day of December 1923.

ALBERT J. ALLEN.